United States Patent
Liu et al.

(10) Patent No.: US 7,538,744 B1
(45) Date of Patent: May 26, 2009

(54) METHOD AND APPARATUS FOR COMPUTER-AIDED DETERMINATION OF VIEWER'S GAZE DIRECTION

(75) Inventors: Jin Liu, Berlin (DE); Siegmund Pastoor, Berlin (DE)

(73) Assignee: Fraunhofer-Gesellschaft zur Foerderung der Angewandten Forschung E.V., Munich (DE)

( * ) Notice: Subject to any disclaimer, the term of this patent is extended or adjusted under 35 U.S.C. 154(b) by 577 days.

(21) Appl. No.: 10/129,217

(22) PCT Filed: Oct. 27, 2000

(86) PCT No.: PCT/DE00/03843

§ 371 (c)(1),
(2), (4) Date: Apr. 30, 2002

(87) PCT Pub. No.: WO01/33323

PCT Pub. Date: May 10, 2001

(30) Foreign Application Priority Data

Oct. 30, 1999 (DE) ................. 199 53 835

(51) Int. Cl.
*G09G 5/00* (2006.01)
*A61B 3/10* (2006.01)
(52) U.S. Cl. ................. 345/7; 345/8; 351/212
(58) Field of Classification Search ................. 345/7–9, 345/156–184; 348/50–60; 351/239–243; 359/630–633
See application file for complete search history.

(56) References Cited

U.S. PATENT DOCUMENTS 4,973,149 A * 11/1990 Hutchinson ................. 351/210

(Continued)

FOREIGN PATENT DOCUMENTS

DE 197 31 303 2/1999

(Continued)

OTHER PUBLICATIONS

Epworth, Richard, Eye Movements for a Bidirectional Human Interface, ICL Technical Journal, pp. 385-411, vol. 7, Issue 2, H. Charlesworth & Co. Ltd., Huddersfield. Nov. 11, 1990.

(Continued)

*Primary Examiner*—Duc Q Dinh
(74) *Attorney, Agent, or Firm*—Brinks Hofer Gilson & Lione

(57) ABSTRACT

The corneal reflex method is used to detect the current direction of view (VD) of a user (UE) to perform specifically selected functions on a computer. Eye vectors (EV) can be detected between the pupil center (ZP) and reflection points (RP) on the cornea (CA) that can be associated with a fixation point (FP) on a computer screen using infrared light (IRS). The association is produced as a function of the direction of view (VDF), so the relationship is detected during an initial calibration (C) by a referenced user (RE) to develop a set of reference eye vectors (EVR). A shorter self-balancing recalibration (RC) is then carried out for each subsequent user (UE). A mapping function (MF) is detected during the recalibration (RC) so that the individual eye vectors (EVU) can be converted to the reference eye vectors (EVR) by the mapping function. The recalibration (RC) can take place without the user (UE) realizing it. The method is useful in medical diagnostics, psycho-optical examinations and eye-controlled interaction with multimedia computers.

23 Claims, 3 Drawing Sheets

U.S. PATENT DOCUMENTS

Figure 1:
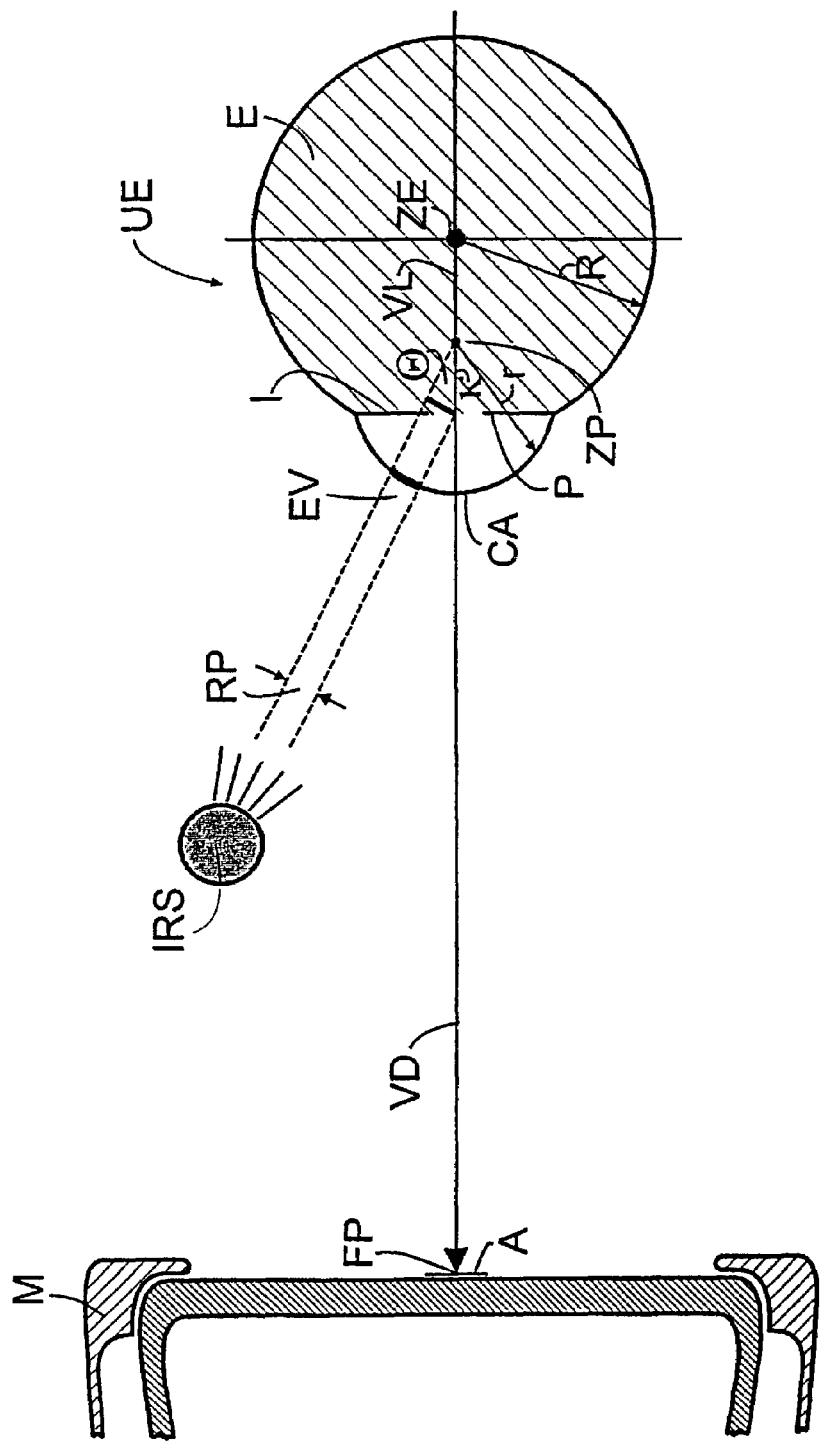

| | | | |
|---|---|---|---|
| 5,220,361 A | | 6/1993 | Lehmer et al. ............... 351/226 |
| 5,471,542 A | * | 11/1995 | Ragland ...................... 382/128 |
| 5,574,473 A | * | 11/1996 | Sekiguchi ....................... 345/8 |
| 5,634,141 A | | 5/1997 | Akashi et al. .................. 396/51 |
| 5,678,066 A | | 10/1997 | Sato ............................ 396/51 |
| 5,717,413 A | * | 2/1998 | Mizouchi ....................... 345/7 |
| 5,875,121 A | | 2/1999 | Yetter .................. 364/715.011 |
| 6,091,378 A | * | 7/2000 | Richardson et al. ............. 345/7 |
| 6,191,892 B1 | * | 2/2001 | Isaka et al. ................... 359/630 |
| 6,346,929 B1 | * | 2/2002 | Fukushima et al. ............ 345/8 |
| 6,348,877 B1 | * | 2/2002 | Berstis et al. ................ 340/980 |
| 6,373,961 B1 | * | 4/2002 | Richardson et al. ......... 382/103 |
| 6,421,064 B1 | * | 7/2002 | Lemelson et al. ........... 345/688 |
| 6,433,759 B1 | * | 8/2002 | Richardson et al. ............ 345/7 |

FOREIGN PATENT DOCUMENTS

| | | |
|---|---|---|
| DE | 197 36 995 | 3/1999 |
| EP | 0 055 338 A1 | 7/1982 |
| EP | 0 631 222 A1 | 12/1994 |
| GB | 2 116 334 A | 9/1983 |
| JP | 6304142 | 11/1994 |

OTHER PUBLICATIONS

Liu: Determination of the Point Fixation in a Head-Fixed Coordinate System; 14th International Conference on Pattern Recognition, Aug. 16-20, 1998, Brisbane, Australia.

Schlussbericht: Verfahren zur blickgesteuerten Interaktion mit autostereoskopischen Multimedia-Displays; Heinrich-Hertz-Institut fuer NAchrichtentechnik Berlin GmbH.; 01 BK 410/8 (BLICK); Jan. 1, 1995-Dec. 31, 1998.

Press et al,: Numerical Recipes in C, The Art of Scientific Computing; Chapter 14, Modeling of Data; Cambridge University Press (printed in the US 1990).

Talmi et al.: Eye and gazie tracking for visually controlled interactive stereoscopic displays; ELSEVIR Signal Processing: Image Communication 14 pp. 799-810 (1999).

Kou: Bildverarbeitung durch das visuelle System; pp. 126-129; Springer Verlage, 1982.

* cited by examiner

METHOD AND APPARATUS FOR COMPUTER-AIDED DETERMINATION OF VIEWER'S GAZE DIRECTION

BACKGROUND OF THE INVENTION

1. Field of the Invention

The invention relates to a computer-aided method of contact-free video-based determination of the direction of view of an eye of a viewer for the eye-controlled man-computer interaction in accordance with the cornea reflex method of detecting view-direction dependent eye vectors between the detectable center of the pupil and reflex points which are generated on the cornea by aimed infra red irradiation and which can also be detected, with calibration with respect to at least one calibration point which can be depicted on a video screen for defining a view direction function and a recalibration to be performed in dependence of the generation of image objects and a plurality of reflex points for correcting systematic errors of measurement, and to an apparatus for practicing the method.

2. The Prior Art

The continuing integration of information technological systems offers computer users a wide spectrum of novel services and access to almost unlimited multi-media data sources. The increased possibilities of utilizing computers lead to increasingly higher demands in respect of the user interface. Solutions are being sought which would enable users of vastly differing initial knowledge to completely control computers. Among these, particular importance is to be attached to a progressive user interface which places more emphasis on human perceptiveness and a natural repertoire of possible interactions than is the case with current graphic interfaces including a mouse and a keyboard. The spatial presentation of information on a 3D-display not requiring spectacles, support of active vision by influencing the presentation of information by way of the head position and the view direction and non-command based interactions anticipated by an interface agent on the basis of the viewing behavior are key elements.

Different proposals based upon novel presentation and interaction techniques have been made as regards a viewer's desire for quick cognitive orientation, complete hold on and personal control over the novel systems. Among these are, in particular, intuitive direct manipulation by active viewing and manual gestures. As in natural viewing, the viewing perspective may change as the head moves. In this manner, for inspecting hidden planes, objects in the foreground may be laterally pushed away. Additional visual interactions become possible by detection of the viewing direction or of a fixation point. For instance, looking at a media object may be utilized for the fading-in of context information. A synthetic depth of field coupled to the fixation point may be useful to the user to concentrate his attention on the selected media object. Moreover, the viewing direction may be utilized to address, move or zoom video screen objects by visual fixation (eye mouse function).

Methods of measuring the viewing direction have in the past been primarily developed for laboratory experiments or for purposes of medical diagnostic, rather than for application in interactions between man and computer. The technological possibilities have in essence been known since the seventies and may be distinguished between contact-free and non-contact-free methods. The non-contact-free methods, for instance, require the attachment of skin electrodes to the face of a viewer or carrying special spectacles or contact lenses. For man-computer interaction, video-based techniques are suited best. To this end, an image of the eye is recorded by a video camera, preferably filling the format, and is evaluated in accordance with different criteria. For purposes of a contact-free measurement the view measuring camera is set up close to the video screen. A tele optic system, optionally provided with a tracking system which aims the camera at the eye even at movements of the head, ensures a format-filling image of the eye. Movements of the pupil are evaluated relative to a reference system such as, for instance, the center of the camera image. For precise measurements, the eye is illuminated by weak non-blinding infrared light to illuminate the eye region and selectively to generate reflections at border layers, such as, for instance, at the surface of the eye and at the rear surface of the cornea (Purkinje reflexes). The position of the reflection relative to the center of the pupil are evaluated. The strongest reflection occurs at the surface of the cornea. The so-called cornea reflex method (see "Bildverarbeitung durch das visuelle System", A. Korn, Springer Verlag, 1982, pp. 126 ff.) drawing on the fact that the cornea reflects impinging light which can be detected as a bright spot on the surface (cornea reflex), enables precise contact-free measurements over an extended period of time without recalibrations. The view measuring camera is aimed at an eye of the user by signals from a head tracker and follows the eye even at movements of the head.

During the course of the image evaluation, first the pupil is localized by iteratively approaching the pupil with a line of annular contour in accordance with the least-square method. Thereafter, the reflex point is determined as the center of the largest very light area in a somewhat broadened environment of the pupil, by a simple threshold value operation. In this manner, the so-called eye-vector is being defined which points from the center of the pupil to the center of the reflex point. At ever change of the view direction the eye-vector between the centers of the pupil and of the reflex point changes continuously relative to the view direction. The value is a function of the geometry of the individual eye (radius of curvature of the cornea and of the eyeball) and may be defined by a continuous function (view direction function). The view direction function has to be determined by the calibration. Following the calibration, at which the user must sequentially fix, e.g., five calibration points as pointed objects on the video screen, the eye-vectors may be calculated relative to the calibration points. The more calibration points used in a predetermined viewing sequence and the longer the fixation period of any given user lasts, the more precise will be the determination of the eye-vectors. In the known method, this complex operation must be performed at the beginning of every individual application and this necessitates a high degree of attention and great patience on the part of the user. During fixation of a given calibration point an interpolation model establishes a connection between the X and Y video screen coordinates of the calibration points and the corresponding x and y values of the measured eye-vectors (in the camera image). The individually adjusted parametric values of the model are stored and during view measurement serve exclusively for interpolating the values of the video screen coordinates during fixation of any points of the video screen. Depending upon the number of calibration points and the user's ability to concentrate, the calibration process takes at least one to two minutes.

Movements of the head lead to changes in the eye-vector and, hence, of the calculated view direction, even if the user retains the fixation point. The reason for this change is that the eyeball has to be rotated to ensure alignment of the line of sight with the (stationary) fixation point. Since the view camera has to be inclined and pivoted to retain the eye in the center of the image when the head is moved, the surface normal of the camera sensor changes also. This (systematic) measuring error can be effectively corrected by a newly developed transformation technique (see DE 197 36 995.2 A1 or the paper "Determination of the Point of Fixation in a Head-Fixed Coordinate System", Liu, 14th Intern. Conf. On Pattern Recognition, 16-20 Aug., 1998, Brisbane, Australia). It utilizes a movable coordinate system related to the position of the user's head. For transformation of the measurement data, the center of the eye is selected as the coordinate source. The view direction calculated in the camera image can be converted to the 3D-coordinates of the fixation point by rotation, scaling and translation. The degrees of freedom of the measuring system and of the display are not limited. In this manner, only a few transformation steps are required to compensate for movements of the head. The mentioned explanations have been taken from the paper "Augenmaus & Co.—Entwicklung einer neuartigen Anwenderschnittstelle für Multimedia-Computer" Liu, Pastoor, ZMMS-Spektrum (ISBN 3-932490-52-5) 1999; Vol. 8, pp. 56-70, and from the final report on the support project 01BK410/8 (BLICK), 30.04.99, pp. 57-61.

Before discussing individual calibration methods in greater detail hereafter, a definition of the term "calibration" will first be interjected. It is because confusion often arises in connection with the use of this term as it incorrectly also used for compensation and correction processes in measuring methods. The calibration process is to be understood as a "calibration process" of a measuring arrangement for determining a relative reproducible connection between output values and individual input values. By contrast, the calibration process has to be defined as "gaging process" for examining and defining absolutely the measuring precision and certainty of measuring instruments. Compensation processes, such as, for instance, compensating for the head movement when defining the view direction or correction processes, for instance correcting the measurement value at a change in distance of the user within the spatial depth relative to the view measuring camera, are not calibration processes. To speak of these as "post or recalibrating" is not correct in terms of measuring technology.

In some prior art applications in the field of a video-based determination of the view direction no explicit calibration processes is provided. In a camera with a view-controlled autofocus according to U.S. Pat. No. 5,678,066 the individual user cannot perform any calibration process. In accordance therewith, the range of selection can be segregated into three regions only, corresponding to a very coarse determination of the view direction. A camera of the same type provided with an improved lens-mirror arrangement and a more advanced detection method is described in U.S. Pat. No. 5,875,121. In this case, too, no individual calibration is possible; view measuring distinguishes only in four main directions "left", "right", "above" and "below". An improvement of the measuring precision with calibration results from the head of the user being fixed, so that only the physiological properties of the eye systematically affect any error. Such a measure has been in the context of a method of measuring the visual field of patients in U.S. Pat. No. 5,220,361. For an at least partial compensation of the systematic measurement error a total of four reflex points are generated on the cornea; in this fashion the distance between the eye and the sensor can be determined. However, the individual geometry of the eye (e.g. the radius of the eye) is not taken into consideration. Overall it can be said that in methods which do not include calibration the view direction can be measured with a substantially reduced precision and that the results yielded can only be coarse estimates of the view direction. This is, however, insufficient for many applications. These are "simple systems" without individual calibration, which rely on the generalized parameters of "standard eyes". Sufficient precision can only be attained if the eyes of the user are identical to the standard eyes.

This distinguishes them from the "elaborate systems" in which a time-consuming and work-intensive calibration is performed for each individual user. They differ in the number and arrangement of the applied calibration points. In general, the precision increases with the number of applied calibration points. U.S. Pat. No. 5,634,141 discloses a camera with a view-controlled autofocus system and in which calibration may be performed individually. To this end, two horizontally aligned calibration points are provided at the viewer of the camera. To generate reflex points around the eye of the user which serve to measure his individual pupil diameter and to calculate the axis of the eye as a result of different assumptions on the basis of standardized eyeball parameters (causality examination), two of six infrared light diodes disposed around the viewer are used in pairs, depending upon the position of the camera and the condition of the user. Here, too, the precision of the calibration is only adequate to define visual ranges, in this instance three ranges in a horizontal direction. In order somewhat to reduce the complexity of the calibration, the camera provides storage of different sets of calibration such as, for instance, for different users or for users wearing or not wearing spectacles. In case of need, the corresponding set of data may then be retrieved. Aside from the fact that for purposes of exact measurements it is extremely important to retrieve the set of data appropriate for a given user, automatic adjustment to individual eye data is not guaranteed. In order to take changes into account it is necessary to perform a new calibration.

The state of the art upon which the invention is based is described in German laid-open patent specification DE-OS-197 31 303 A1. It discloses a method for contact-free measuring, correctively taking into account large movements of the head or eyes, the view direction. In the method, the coordinates of spider lines for the center of the pupil and at least one corneal reflection of a single user are calibrated in respect of at least one calibration point (thirteen calibration points for the utmost precision). To this end, the appropriate number of calibration points are displayed on a video screen. The user must then, for a sufficient length of time and in a predetermined sequence, fix these calibration points. This is subject to automatically controlling whether he has looked at the fixation target for a sufficient length of time and whether he is following it. If the user does not perform properly, he will be prompted to repeat. On the basis of different mathematical models and approximation processes a transformation matrix (view direction function) will then be derived from the attained measurement data of the pupil position, corneal reflection and the coordinates of the predetermined calibration points. Furthermore, the known method provides for an "automatic adjustment of the calibration data" at horizontal and vertical changes in the distance between the eyes of the viewer to the video screen and to the image measuring camera. This is, in fact, a compensation or correction of significant movements of the head and eyes in the plane parallel to the video screen. An "automatic post-calibration" is disclosed as well. This is a purely mathematical adjustment at changes of the distance between the eye to the camera lens (in the depth dimension) by way of the correspondingly changes autofocus setting. However, in the sense of the definition set forth supra neither correction process can be correctly classified under the term "calibration". It is different, however, in respect of the dynamic "re-calibration" which is also provided. To correct systematic errors of measurements, for instance of changes in the diameter of a pupil, a comparison of desired and actual values relative to previously defined objects is repeatedly performed on the video screen for each individual user. In case a permissible measurement error is exceeded recalibration occurs automatically. Aside from the fact that it is not clear how the system recognizes the excess, this dynamic recalibration constitutes a significant annoyance to the user who will always and by way of surprise be subjected—even in active use—to a new calibration process.

Hence, it may be said overall that known calibration processes in methods of defining a view direction significantly curtail the comfort of a user. On the one hand, he is required to exercise a high degree of concentration and great patience during fixation of the calibration points, particularly moving ones. On the other hand, different users of a view direction measuring system must, before use, each go through an individual complex calibration process in order to ensure his individual calibration data.

OBJECTS OF THE INVENTION

For that reason, the task of the present invention is to be seen in providing an improved method with integrated calibration and, more particularly, recalibration for correcting systematic errors of measurement, relative to the prior art, of determining a view direction and which ensures both a maximum precision for measuring the view direction and minimum discomfort to the user. Moreover, it is a task of the invention to allow use of the view direction measuring system for a plurality of individual users without subjecting them to the calibration process. In addition to reducing the complexity for individual users, the complexity of the measuring system is also to be reduced so that calibration may be performed without complex mathematical processes or additional elaborate system components.

SUMMARY OF THE INVENTION

To accomplish the task, the computer-aided method of contact-free video-based determination of the view direction of a viewer's eye for eye-controlled man-computer interaction of the kind described supra provides for storing and one-time determination, simultaneously with the calibration, of a set of data relating to a reference eye as a connection between the vectors of the eye of any reference eye and at least one reference point, and recalibration, for every actual user, taking place, without his active participation, at an arbitrary viewing of at least one icon as image object, by a rebalancing definition of the individual eye-vectors of the eye of the given user's eye and by establishing and storing a transformation function for adjusting the vectors of the reference eye to the vectors of the actual user's eye.

In the measuring method in accordance with the invention, calibration and recalibration are chronologically completely separated and relate to different users. The calibration proper now takes on the character of an initial reference-forming operation which need be performed but once at the beginning of the measurements. To be sure, the prevailing complexity corresponds to the complexity of known methods with a time-dependent fixation of different arbitrary calibration points taking into account all system and process parameters. However, only one person will be subjected to the role of a "reference person". This "reference person" possesses the "reference eyes" to which the measuring method will be initially set or calibrated by determining vectors of reference eyes. These are not so-called "standard eyes" of average determined standard dimensions, but eyes of any person at all.

The individual recalibration thus corresponds to an adjustment of the reference-forming calibration to an individual user. His physiological eye geometry (radii of curvature of the cornea and of the eyeball) is being determined and taken into consideration by defining, and transforming to the reference eye vectors, the individual vectors of the user's eye. Recalibration takes place as an integral part of the process without active participation by the user so that he is not disturbed. Time and concentration efforts are thus spared. An individual user is no longer subjected to annoying and time-consuming routines which force him to stare, at a high level of concentration and in a predetermined sequence, at a plurality of fixation points. Nevertheless, the calibrations will always be up to date and lead to highly accurate measurement results. In order to obtain a plurality of eye vectors for the transformation in the shortest possible time, many reflex points are necessary on the cornea. With one fixation point only, they are generated, without any burden on the user, by a corresponding number of infrared light sources. If the user arbitrarily looks at the video screen, several eye vectors may thus be defined at the same time. This leads to a substantial reduction in the fixation time. An icon whose coordinates are known to the system assists in drawing the view of the user to the video screen. This assumes that the user, when looking at the video screen, will also look at the icon. This makes him feel neither exerted nor bored; he only follows his "curiosity complex".

In summary, the recalibration in accordance with the invention is not an explicit calibration process requiring the user consciously to do something, but, rather, self-balancing in the manner of an automatic evaluation of subconscious actions of the user without burdening him. Thus, the invention provides for a "simple" measuring method, comparable to those methods involving standardized calibration but which, nevertheless, possesses the measuring accuracy of a "complex" measuring method involving repeated calibrations.

In the known method upon which the invention is based, recalibration, accepting the annoyance for the user, basically takes place dynamically in dependence of detecting an excessive error. Since, in contrast to this known recalibration, the user is not consciously aware of the recalibration in the method according to the invention, it is of advantage, in accordance with an improved embodiment of the invention, to perform the recalibration, for correcting the systematic errors, dynamically. This ensures that the determination of the view direction is always precisely calibrated, for an individual user and extended use times which may lead to fatigue as well as for different users which have refrained from registering with the system. The intervals for repeating the dynamic recalibration is specific to the user.

In accordance with a further improvement of the method in accordance with the invention, the transformation function is determined and stored as a mapping function by application of the least-square-filling technique. The least-square-fitting-method is a general known method (see, e.g. "Numerical Recipes in C", W.H. Press et al., Cambridge University Press, 1990, Chapter 14) for minimizing the square error of an equation system. More detailed explanation in this regard may be found in the specific specification hereof.

The invention may provide, furthermore, for one or more icons of constant or changing, more particularly reducing size being presented stationarily or randomly jumping on the video screen. As has already been stated hereinabove, icons have not the character of simple calibration points which quickly bore a viewer. Rather, they are presentations of imaginary character which automatically attract the attention of a curious user. This does not require a physical presentation. Several design are possible including those with changes, variations or combinations.

All mentioned methods of defining the view direction may proceed from a fixed or moving head position. Where movements of the head are permissible it will not be necessary to compensate, in accordance with a further embodiment of the invention, those head movements which affect a change of the eye vectors in which the determination of measurement values are compensated by detecting the actual position of the head. The eye vectors derived therefrom will then be transformed to vectors by the constant coordinates of the video screen. To accomplish this, a number of methods exist (see, in particular, DE 197 36 995.2 A1, DE 197 31 303 A1 (disclosed herein by the term of an "automatic post-calibration" at changes in the distance between the eye of the user and the fixation point as a result of head movements) or the paper "eye and gaze tracking for visually controlled interactive stereoscopic displays" by Talmi, Liu; Elsevier/Signal Processing: Image Communication 14 (1999) pp. 799-810, Chapter 4.3).

In addition to the method in accordance with the invention, an apparatus for practicing is claimed also, including the system components requisite of the provided calibration: (1) view direction sensor and infrared illumination, (2) view detector, (3) evaluator, (4) icon generator, (5) reference data and view direction function storage, (6) transformer and mapping function storage, (7) view direction determinator and (8) video screen. Preferred embodiments of the system components may be taken from the dependent claims. In order to avoid repetitions in connection with the structure of the system and function of individual components, reference is made to the ensuing specific part of the specification, in particular FIG. 3.

DESCRIPTION OF THE SEVERAL DRAWINGS

Figure 2:
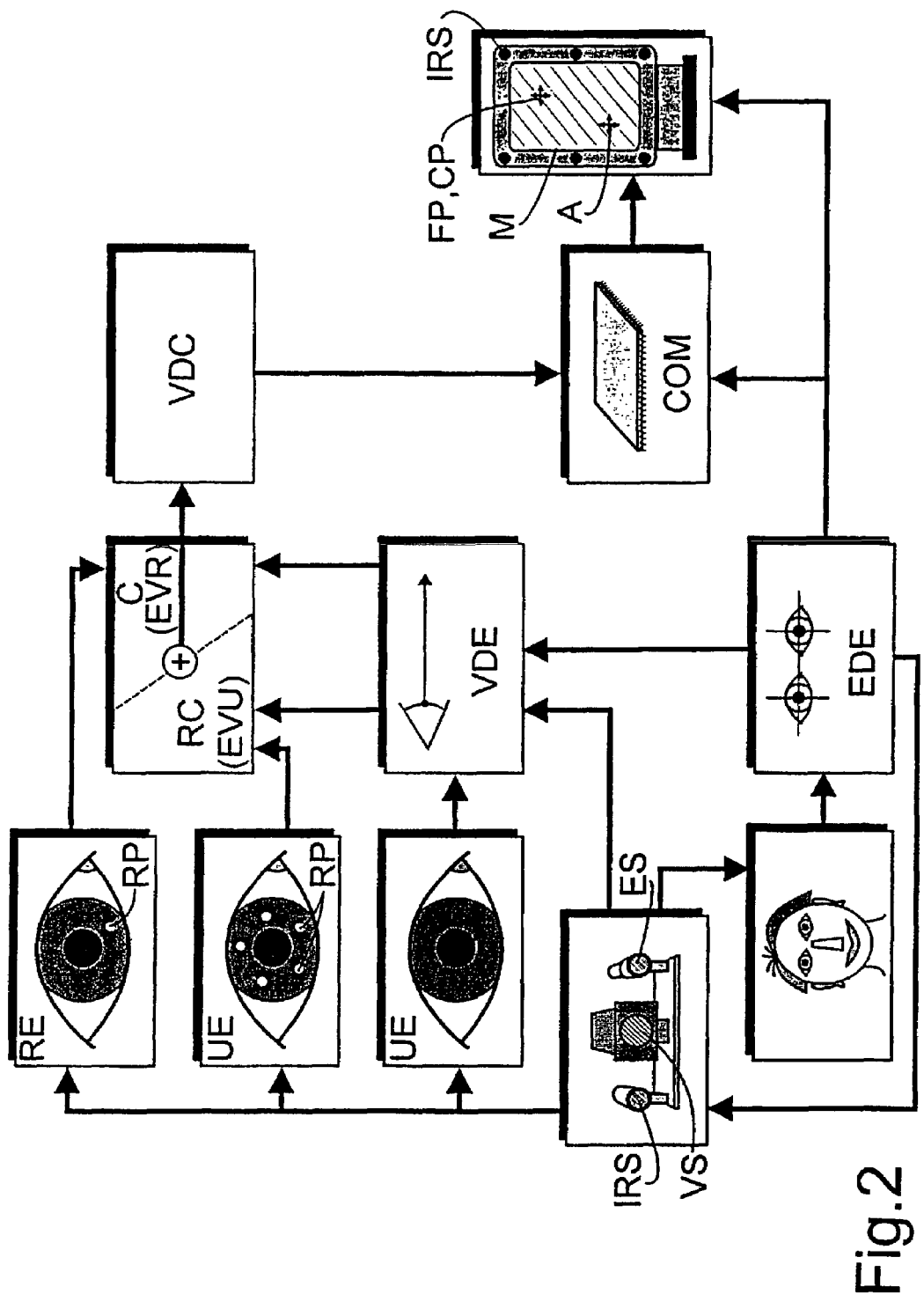
Figure 3:
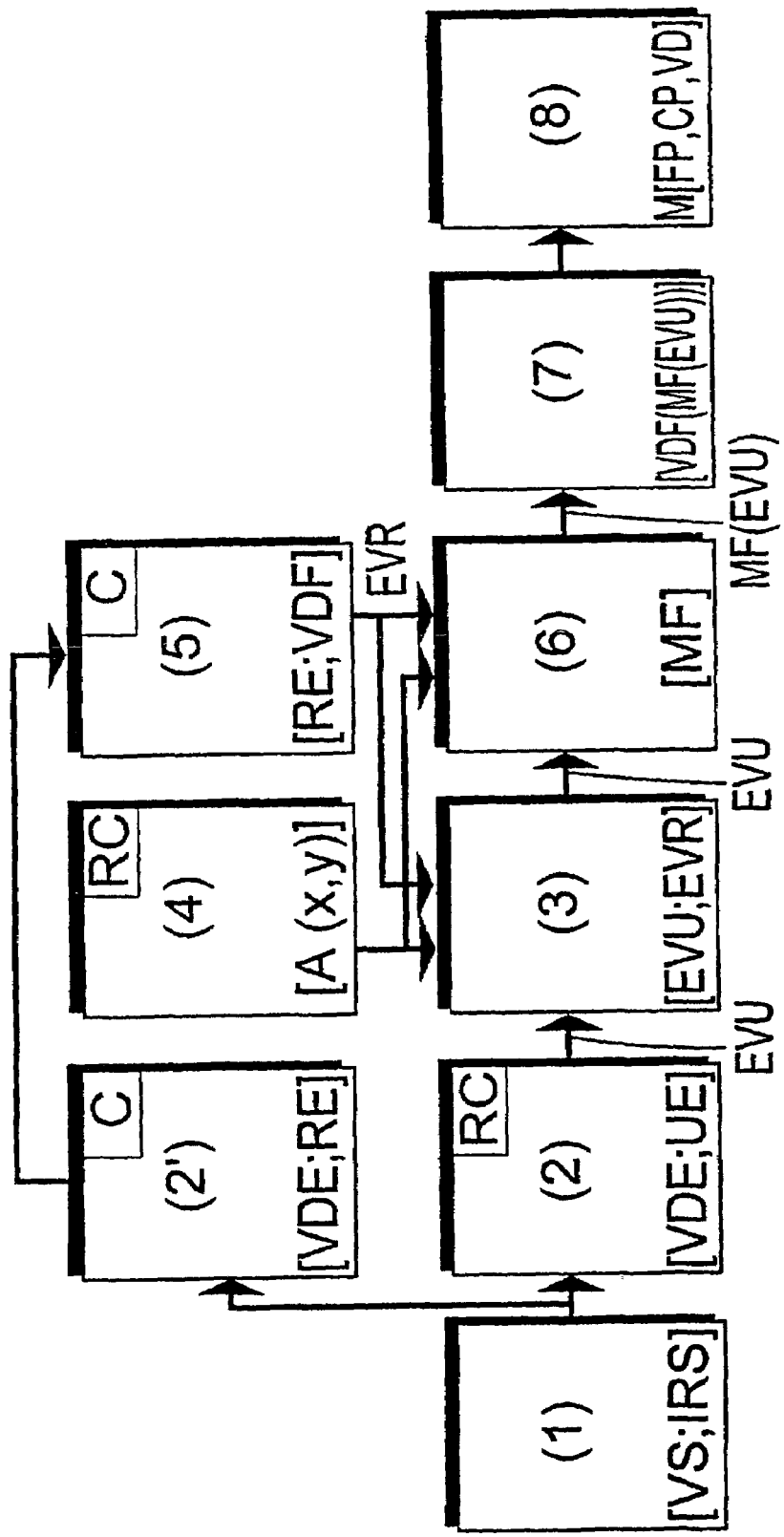

The novel features which are considered to be characteristic of the invention are set forth with particularity in the appended claims. The invention itself, however, in respect of its structure, construction and lay-out as well as manufacturing techniques, together with other objects and advantages thereof, will be best understood from the following description of preferred embodiments when read in connection with the appended drawings, in which:

FIG. 1: depicts the eye geometry for the known principle of the cornea-reflex-method;

FIG. 2: is a structural presentation of the method in accordance with the invention, and FIG. 3: is a structural presentation of the system components of a measuring apparatus required for a calibration.

DETAILED DESCRIPTION OF THE PREFERRED EMBODIMENTS

FIG. 1 depicts a simplified model for describing the human eye on the basis of which the basic concepts of the process in accordance with the invention proceeding on the cornea-reflex-method are to be described in greater detail. The eyeball E is an approximate sphere having a fulcrum ZE. The cornea (Cornea CA) is positioned at the forward side of the eyeball E, and its surface is spherically shaped and is of radius r. The iris I is modeled as a circular disc having a central aperture (Pupille P). The optical axis of the eye E connects the fulcrum ZE of the eyeball with the center ZP of the pupil P and is called visual axis VL the direction of which (it points from the fulcrum ZE to the center ZP of the pupil) defines the view direction VD. When the view direction VD is changed the eyeball E rotates about its fulcrum ZE. The fixation point FP is the intersection of the visual axis VL of an eye E and the surface of the viewed icon A. In normal dual eye vision the fixation point FP is positioned at the intersection of the visual axes VL of both eyes E. A number of methods already exist for measuring the visual movement of an eye; the cornea-reflex-method is the most widely known method of contact-free measuring the view direction from a distance.

The cornea-reflex-method is based on the fact that the cornea CA reflects the impinging light from the infrared source IRS and that the cornea reflex at the surface of the cornea is seen as a bright point having an opening angle $\theta$. When the view is changed, the eye vector EV (EV=$\kappa \sin \theta$ with hypotenuse $\kappa$) between the center of the pupil ZP and the reflex point RP changes monotonously relative to the view direction VD. Its size depends upon the geometry of the eye UE of the user (radius of curvature r of the cornea CA, radius R of the eyeball E) and may be defined by a monotonous function VDF (view direction function). The view direction function VDF may be determined by calibration.

FIG. 2 depicts a structural diagram of the cooperation of the essential steps of the method of the measuring method in accordance with the invention of determining the view direction. To this end several reflex points RP are generated by several infrared sources IRS on the cornea CA of a user eyeball UE. The reflex points RP are than captured by a view direction sensor VS (view camera) which transfers the coordinates to a computer-aided view detector VDE for determining the actual view direction VD. The head or eye position HP is registered by an eye position sensor ES (eye and head tracker), and the coordinates of the position HP is transmitted to a computer-aided eye detector EDE. On the basis thereof the view detector VDE determines the eye vectors EV and, thereafter, by way of the view direction function VDF determined by the calibration C, the fixation point FP on a video screen M actually gazed at by the user UE. The two detectors VDE and EDE are data connected. Thus, compensation for movements of the head may be automatically joined by a corresponding transformation function in consequence of the absolute eye coordinates determined by the eye detector EDE.

In the embodiment selected, the monitor M depicted in FIG. 2 is an autostereoscopic video screen for spatial viewing without auxiliary means. Such video screens may be used for systems executed for eye-mice. They must, however, be precisely aligned with the eyes of the user to ensure an impression of depth. To this end the video screen M may track the position of the eye. The required image contents (different perspectives, striped raster design) are detected by a computer COM.

An essential element of the invention in accordance with the invention is the initial reference-related calibration C. It determines the transformation function between the measured eye vectors EV of the reference eye RE and the viewed fixation points FP on the video screen M (reference-related view direction function VDF). Prior to the actual measurements, the centers of the pupils ZP and the reflection points RP on the cornea CA of any reference eye RE generated by corresponding infrared light sources IRS are detected by the view detector VDE in an initial measurement run, during which the reference user RE views calibration points CP on the video screen M. The infrared light sources IRS are arranged adjacent to the view measuring camera VS and, in the example shown, around the video screen M, so that a corresponding number of reflex points RP will be generated on the reference or, later, user eye RE/UE. The larger the number of different calibration points CP which must be fixed by the reference user RE for a predetermined time, the more precise will be the initial measurement value calibration. The measurement values for determining the reference eye vectors EVR are subjected to the same mathematical process as has been described hereinabove. The view direction function VDF (CP, EVR) related to the reference eyes RE is being determined.

Following execution of the initial reference-related calibration C is measuring system will be calibrated to the reference eye RE. At the beginning of use of the measuring system by an individual user UE automatic balancing of the reference data will take place on the basis of a recalibration RC inherent in the system. The eye UE of the user will now be illuminated by a plurality of infrared light sources IRS arranged around the monitor M, thus generating a corresponding number of reflex point RP on the eye UE of the user. To detect them, the user UE must now unconsciously and briefly look at a single icon A on the video screen M. During this time, the individual eye vectors EVU era being determined and transformed to the reference eye vectors EVR. The transformation function thus definable is called mapping function MF. The measuring system is now calibrated to the actual user UE and ready to provide precise results when measuring the actual view direction VD of the user UE, thus leading to a high spatial resolution during view point determination. During the measurements the momentarily look-at fixation points FP on the video screen M will be defined by the view direction function VDF and the mapping function MF; FP=VDF (MF (EVU)).

In connection with the description of the calibrating process, the least-square-fitting technique (LF-technique) upon which the process is based, will now be dealt with in greater detail.

DEFINITIONS

Eye vector EV with components $(a_x, a_y)$ measured on the image of the eye. Fixation point FP (or calibration point) $(f_x, f_y)$ measure on the video screen. View direction function VDF establishes the connection between EV and FP, properties of VDF: monotonous and unambiguous.

Assumptions:

I) The VDF is a linear function. The connection may then be formulated as $$f_x = c_o + c_1 a_x + c_2 a_y \text{ and}$$

$$f_y = c_3 + c_4 a_x + c_5 a_y$$

The coefficients $\{c_1\}$, i=0, ... 5, may be defined during calibration by an appropriate number of calibration points or II) The VDF is a square function. The connection may then be defined as $$f_x = c_o + c_1 a_x + c_2 a_y + c_3 a_x a_y + c_4 a_x^2 + c_5 a_y^2 \text{ and}$$

$$f_y = c_6 + c_7 a_x + c_8 a_y + c_9 a_x a_y + c_{10} a_x^2 + c_{11} a_y^2$$

The coefficients $\{c_1\}$, i=0, ..., 11 may again be defined during calibration by a corresponding larger number of calibration points.

Solving on the Basis of the Coefficients $c_1$

At least 3 measuring points are required for assumption 1) (2 equations×3 measuring points for 6 equations with 6 unknowns). Because of occurring measuring noise more than 3 measuring or calibration points are to be selected (5 points in the selected example).

Assuming EV $(a_{xj}, a_{yj})$ and $(f_{xj}, f_{yj})$ FP or CP are calculated:

$$c_o + c_1 a_{xj} + c_2 a_{yj} = f'_{xj} \neq f_{xj} \text{ J}=1, \ldots 5$$

$$c_3 + c_4 a_{xj} + c_5 a_{yj} = f'_{yj} \neq f_{yj}$$

The LSF now states that the square error is to be minimized:

$$F = \Sigma(j=1 \ldots 5)(c_o + c_1 a_{xj} + c_2 a_{yj} - f_{xj})^2 + \Sigma(j=1 \ldots 5)(c_3 + c_4 a_{xj} + c_5 a_{yj} - f_{yj})^2$$

The $\{c_i\}$, i=0, ..., 5 are to be defined at a known EV. To this end F is transformed to the coefficients $c_i$ which may then be defined by solving the equation systems (for instance by the "singular value decomposition method). At least 6 measuring points are required for assumption II. The solution is identical.

The same technique is also used to calculate the mapping function MF which adjusts the data EVU to the EVR. In it, $(a_x, a_y)$ are the components of the reference eye vector (EVR) measured on the image of the eye of the reference person, and $(f_x, f_y)$ are the components of the user's eye vector (EVU) measured at the image of the user's eye. The mapping function then establishes the connection between EVR and EVU to be defined by the coefficients $\{c_i\}$.

FIG. 3 is a structural presentation of the system components of a preferred measuring arrangement required for the calibration. Hereafter, the individual are to be described in greater detail with a view to advantageous embodiments of the apparatus in accordance with the subclaims.

Component (1) View Direction Sensor and Infrared Light Sources:

A video camera of long focal length is used as a view direction sensor VS for measuring the view direction VD. It captures the eye so as to fill the format. The light sources IRS are fixedly mounted adjacent to the camera and/or around the video screen M. In the system shown, one infrared light source IRS is placed adjacent to the camera, and four further ones are placed adjacent to the video screen M (at the 2, 4, 8 and 10 o'clock positions). The most favorable placement as well as the number of light sources IRS depends upon the application and may be varied.

Components (2) and (2') View Detector:

The view detector VDE serves to define the eye vectors (EVR, EVU) on the basis of the image data of the view direction sensor. The known cornea-reflex-method is being used. The centers of the pupil and of the bright points in the camera image are being detected. Proceeding from the center ZP of the pupil the eye vector EV is defined for the center of every bright point. As many eye vectors EV as used infrared light sources IRS may be simultaneously defined. During initial use of the system as well as following changes of the system configuration the reference eye vectors EVR must be measured again (component 2'). The view direction function VDT is determined during a calibration process during which the reference person RE sequentially looks at different calibration points CP. The VDF function is stored in a reference data storage (component 5). While a user UE is using the system the view detector VDE determines the eye vectors EVU of the user UE (component 2).

Component (3) Evaluator

The evaluator compares the reference eye vectors EVR with the user eye vector EVU and determines whether the user is looking in the direction of the video screen. If he is not (EVU and EVR differ markedly), the EVU will be rejected. If he does (EVU deviates insignificantly from EVR) it is assumed that the view fixes the icon A on the video screen M. The EVU are then transferred to a further processing stage (component 6).

Component (4) Icon Generator

The icon A is a graphic object ("lure") generating one or more visual luring points on the video screen M and which captures the view of the user UE. The lure should move on the video screen M in a jumping fashion. Initially, it should be larger to attract attention, and it should then become smaller to increase the accuracy of the measurement. Its actual position (x, y) on the video screen is transferred to the evaluator (3) and to the transformer (6).

Component (5) Reference Data and View Direction Function Storage

This is where the eye vectors EVR of the reference eye ER for several predetermined eye positions are stored. The corresponding head position HP has to be known (fixed or tracked on line). The reference eye vectors EVR for an arbitrary eye position are interpolated from the known vectors. The view direction function VDF is established on the basis of the EVR.

Component (6) Transformer and Mapping Function Storage

The transformer transforms the user eye vectors EVU into reference eye vectors EVR which are stored in the system as reference data (5). This is done by way of the least-square-fitting technique to adjust the EVU data to the EVR. The mapping function MF thus detected and the form of which is to be adjusted to the system parameters (number of infrared light sources IRS and selected type of icon A) is stored. The reference eye vectors EVR provide values representative of the position of the eye in which it looks at the lure and at which the user eye vectors EVU are measured. There is no limit to the kind and manner of the LSF technique nor to the number of test samples of eye vectors. Reasonably they originate from several measurements.

Component (7) View Direction Detector

The view direction detector VDC serves to convert, on the basis of the view direction function VDF, the detected eye vectors EV into the viewed fixation points FP and, hence, into the actual view direction VD of an actual user. One or more eye vectors may be used for the conversion. The appropriate view direction function VDF which is stored in the system (5) and which is detected by means of the reference eye RE is to be used.

Component (8) Video Screen

The different fixation and calibration points FP, CP as well as icons A are presented on the video screen M. It is the general target of the view direction of the user UE and may be structured as an autostereoscopic 3D video screen.

What is claimed is:

1. A computerized method for determining the point a person is gazing comprising the following steps:
    illuminating an eye of a first user with a light source to produce a corneal reflection from the eye,
    using a camera to convert the corneal reflection from the eye of the first user into a two-dimensional image,
    determining from the two-dimension image the position of the corneal reflection from the eye of the first user for each of a first plurality of points the first user sequentially gazes,
    storing a plurality of the positions of the corneal reflection from the eye of the first user for the first plurality of points the first user gazes,
    illuminating an eye of a second user with a light source to produce a corneal reflection from the eye of the second user,
    using a camera to convert the corneal reflection from the eye of the second user into a second two-dimensional image,
    determining from the second two-dimensional image the position of the corneal reflection from the eye of the second user for a second plurality of points the second user sequentially gazes, the second plurality of points being fewer than the first plurality of points,
    determining and storing at least one mapping function,
    using the mapping function to convert the position of the corneal reflection from the eye of the second user to a respective position of the corneal reflection from the eye of the first user, and
    determining the point the second user is gazing from the stored positions of the corneal reflection from the eye of the first user.

2. The method of claim 1, wherein the light source used is infrared light.

3. The method of claim 1 wherein a plurality of light sources is used to produce a plurality of corneal reflections on the eye of either of the first or the second user for a single point the user is gazing.

4. The method of claim 1, wherein the second plurality of points comprises a single point presented on a single position.

5. The method of claim 1, wherein the second plurality of points comprises a single point which is presented on a plurality of positions which decrease in size.

6. The method of claim 1, wherein the second user is using a computer system and the mapping function is determined perpetually while using the computer system.

7. The method of claim 1, wherein the mapping function comprises information about the physiological eye geometry of the second user.

8. The method of claim 1, wherein the mapping function is determined from a least-square-fitting technique.

9. The method of claim 1, wherein the position of the head of either of the first or the second user is determined and used to adjust the camera to the eye of either of the first or the second user.

10. The method of claim 1, wherein any point out of the first or second plurality of points is marked by means of an icon on a video display.

11. A computerized method for determining the point a person is gazing comprising the following steps:
    illuminating at least one eye of a first user with at least one light source to produce at least one corneal reflection from each illuminated eye,
    using a camera to convert the corneal reflection from each illuminated eye of the first user into a two-dimensional image,
    determining from the two-dimensional image the position of each corneal reflection of each light source for a first plurality of points the first user sequentially gazes,
    storing a plurality of positions of each corneal reflection from each illuminated eye of the first user for the first plurality of points the first user gazes,
    illuminating at least one eye of a second user with at least one light source to produce at least one corneal reflection from each illuminated eye of the second user,
    using a camera to convert the corneal reflection from each illuminated eye of the second user into a second two-dimensional image,
    determining from the second two-dimensional image the position of at least one corneal reflection from at least one eye of the second user for a second plurality of points the second user sequentially gazes, wherein the second plurality of points comprises fewer points than the first plurality of points, determining and storing at least one mapping function from a least-square-fitting technique, wherein the mapping function comprises information about the physiological eye geometry of the second user, using the mapping function to convert the position of the corneal reflection from the second user to a respective position of the corneal reflection from the first user, and determining the point the second user is gazing from the stored positions of at least one corneal reflection on the eye of the first user.

12. The method of claim 11, wherein a plurality of light sources is used to produce a plurality of corneal reflections on the eye of any of the first or the second user for each single point gazed.

13. The method of claim 11, wherein the second plurality of points comprises only a single point presented on a single position.

14. The method of claim 11, wherein the second plurality of points comprises a single point which is presented at a plurality of positions which are decreasing in size.

15. The method of claim 11, wherein the second user is using a computer system and the mapping function is determined continuously while using the computer system.

16. An apparatus for determining the point a person is gazing comprising:

at least one light source for illuminating at least one eye of a user to produce light reflected by the eye, at least one camera for converting the light reflected by the eye of the user into a two-dimensional image, at least one video display for presenting at least a plurality of points the user is able to gaze, means for determining at least one corneal reflection of the light from the two-dimensional image and its position on the eye of the user, storage means for a plurality of positions of at least one corneal reflection on the eye of a first user for a first plurality of points the first user gazes, and means for determining at least one mapping function to map the position of the corneal reflection from the eye of the first user to a respective position of a reference corneal reflection from the eye of the first user, the mapping function determining the point a second user is gazing from the stored positions of the corneal reflection from the eye of the first user.

17. The apparatus of claim 16, wherein the video display is an autostereoscopic video display for displaying data generated by a computer.

18. The apparatus of claim 16, further comprising means for determining the position of the head of the user.

19. The apparatus of claim 16, wherein a plurality of light sources is provided which are arranged adjacent to the video display.

20. The apparatus of claim 16, wherein a plurality of light sources is provided which are arranged adjacent to the camera.

21. The apparatus of claim 19, wherein the light sources are arranged around the video display at uniformly distributed positions.

22. The apparatus of claim 16, wherein the means for determining at least one mapping function determine the mapping function continuously while a user is using the computer system.

23. The apparatus of claim 16, wherein the at least one light source is emitting infrared light.

* * * * *